United States Patent [19]

Fantacci

[11] Patent Number: 4,881,882
[45] Date of Patent: Nov. 21, 1989

[54] HANDLING DEVICE FOR TIRES TO BE REMOLDED ON VULCANIZATION PRESSES WITH SELECTION FROM DIFFERENT STOCKS OF TIRES

[75] Inventor: Tosco Fantacci, Pistoia, Italy

[73] Assignee: CISAP S.p.A., Pistoia, Italy

[21] Appl. No.: 199,326

[22] Filed: May 26, 1988

[30] Foreign Application Priority Data

May 27, 1987 [IT] Italy .................. 9396 A/87

[51] Int. Cl.$^4$ .................. B29C 35/00; B29C 43/58
[52] U.S. Cl. .................. 425/38; 198/345; 209/539; 209/586; 414/225; 414/226; 425/145
[58] Field of Search .................. 425/28.1, 29, 34.1, 425/38, 140, 145, 150; 198/345; 414/225, 226; 209/586, 539

[56] References Cited

U.S. PATENT DOCUMENTS

| | | | |
|---|---|---|---|
| 3,222,715 | 12/1965 | Harris | 425/38 |
| 3,222,716 | 12/1965 | Harris | 425/38 |
| 3,656,343 | 4/1972 | Braden et al. | 198/345 |
| 3,697,206 | 10/1972 | Bonazzi | 425/38 |
| 3,932,079 | 1/1976 | Legostaev et al. | 425/38 |
| 3,960,260 | 6/1976 | Azuma et al. | 198/345 |
| 4,197,065 | 4/1980 | Di Rossi | 425/38 |
| 4,364,096 | 11/1982 | Rocco et al. | 198/345 |
| 4,687,107 | 8/1987 | Brown et al. | 209/586 |
| 4,728,274 | 3/1988 | Siegenthaler | 425/34.1 |
| 4,778,060 | 10/1988 | Wessner | 425/29 |

*Primary Examiner*—Willard Hoag
*Attorney, Agent, or Firm*—McGlew & Tuttle

[57] ABSTRACT

From a different stock of tires each time a conveyor belt has a tire placed onto it and centered by a transverse positioning device; in alignment with a vulcanization press or an iron hand or a collecting arm, a number of sensors, particularly photocell sensors, monitor the incoming tire and stop it in the correct position for it to be collected by the iron hand or collecting arm.

13 Claims, 4 Drawing Sheets

HANDLING DEVICE FOR TIRES TO BE REMOLDED ON VULCANIZATION PRESSES WITH SELECTION FROM DIFFERENT STOCKS OF TIRES

The subject of the invention is a reliable device which is capable of reducing labor to a minimum and which handles tires to be remolded so as to feed them to the vulcanization presses from stocks of tires and remove them from the press after processing.

SUMMARY OF THE INVENTION

The device essentially comprises: at least one conveyor belt or similar which has a tire placed onto it; a device for positioning the tire in transit transversely; in alignment with vulcanization press or an iron hand or a collecting arm, a number of sensors, particularly photocell sensors, for monitoring the incoming tire and stopping it in the correct position for it to be collected by the iron hand or collecting arm.

In practice the photocell sensors may comprise one sensor which sends a signal to a conveyor control means to slow the conveyor down, one sensor for reading the diameter and one sensor which receives the information on the diameter and determines the stop position once the travel is completed by a stroke corresponding to the radius.

The transverse positioning device may comprise a pair of stops against which the conveyed tire comes to rest and with respect to which it is centered, and devices for simultaneously releasing said stops to allow the centered tire to continue to pass.

Advantageously, the device comprises: a number of presses and an equivalent number of associated stocks of tires; the conveyor is installed alongside said number of presses and along it are devices for stopping the conveyor itself with the tire in the position in which it can be collected for the press that has called for it; also provided are selection devices for feeding a tire to the conveyor when the press that requires it calls for it. In practice the device may comprise a carriage with the collecting arm and the sensors, which moves along the conveyor to take up a position in alignment with the press that has requested the tire.

The device may also comprise a device for monitoring the presence of a tire in order to start the conveyor.

Advantageously, the conveyor may have two sections, the first alongside the stocks of tires and the second alongside the various presses.

It is an object of the invention to provide a handling device for tires to be remolded utilizing a plurality of presses with a number of different types of molds. The types of molds corresponding to a number of different types of tires which may be selectively supplied from a stock of tires to the corresponding press by a conveyor, and a collecting arm with a tire grab. The availability of any press with a specified mold type being signalled to a selector which effects the selective supplying of a specified type of tire.

It is another object of the invention to provide a method of handling tires to be remolded with selection from different stocks of tires. The method comprising the steps of: selecting a type of tire based upon an availability of a press with a corresponding mold type; conveying the selected tire toward the press on a conveyor; locating the center of the selected tire by, measuring the diameter of the selected tire by sensing a forward edge of the tire and a rearward edge of the tire as it passes by a first specified location at a specified speed and processing the data of the speed and a time for the tire to pass the specified location; stopping the conveyor; moving the selected tire into the press with the corresponding mold type from the conveyor; returning the tire to the conveyor after a remolding process; signalling to re-initiate the step of selecting a type of tire.

A better understanding of the invention will be obtained from the description and the accompanying drawing which shows a practical but non-exhaustive example of the invention itself.

Figure 1:
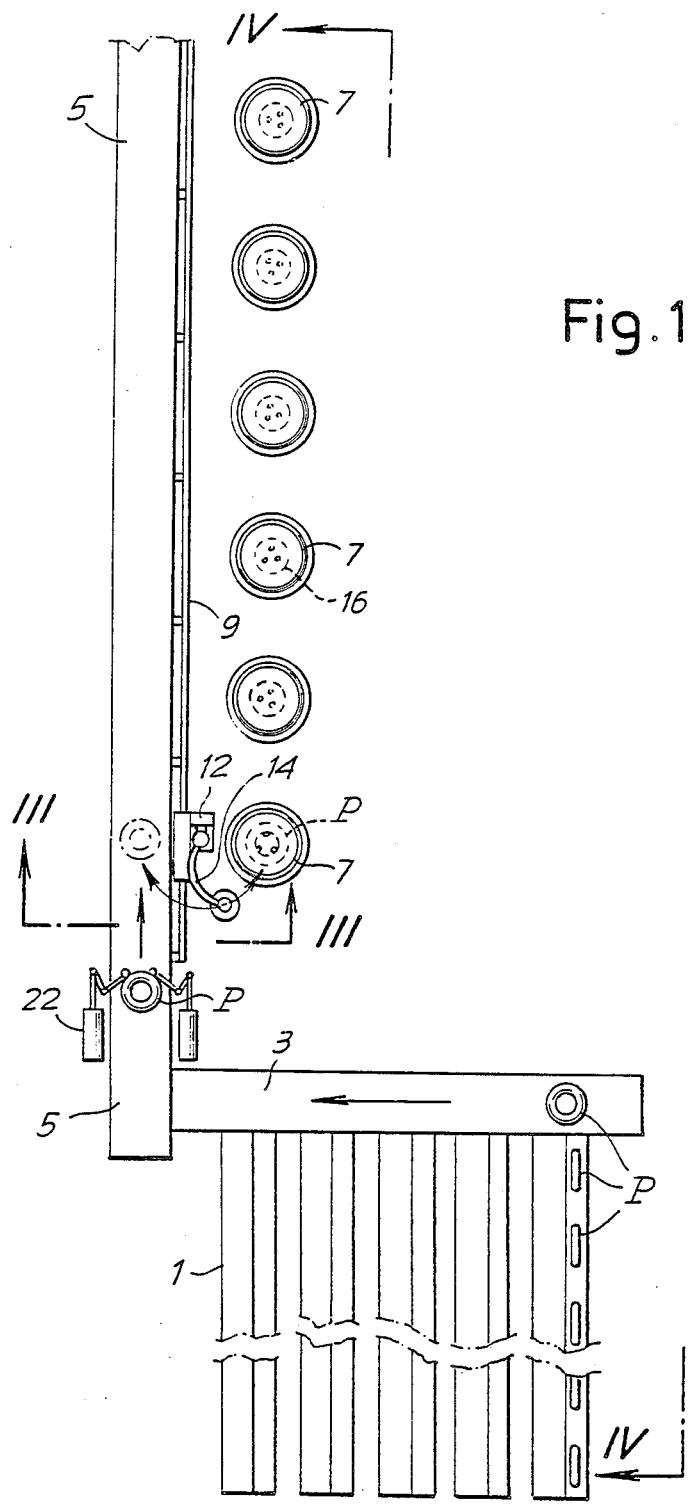
FIG. 1 is a schematic plan view.
Figure 2:
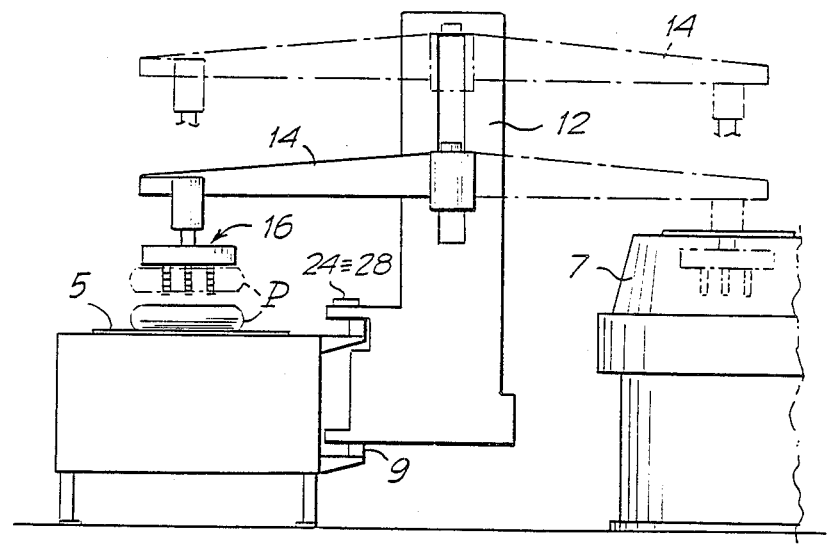
FIG. 2 is a transverse section essentially through II—II in FIG. 1.
Figure 3:
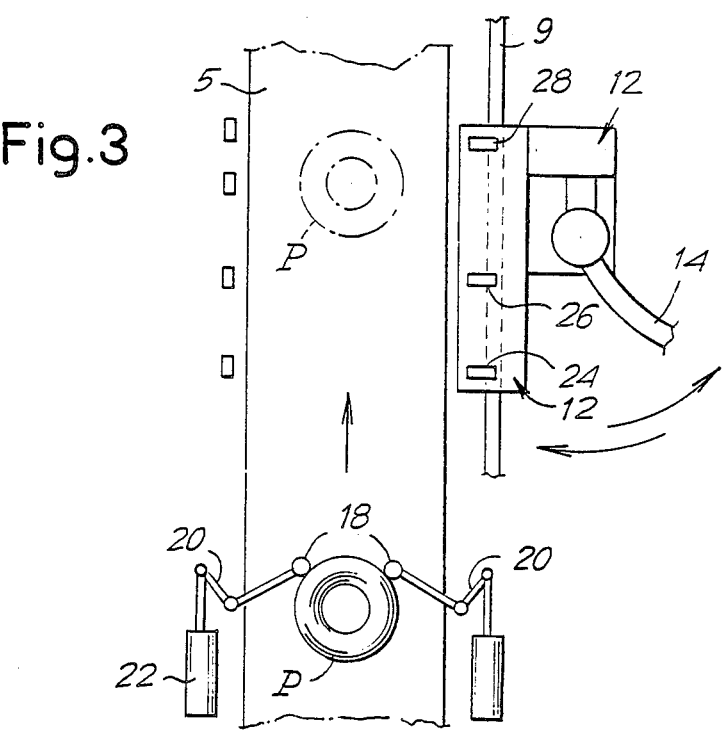
FIG. 3 is a special enlargement of a tire centering and control area.
Figure 4:
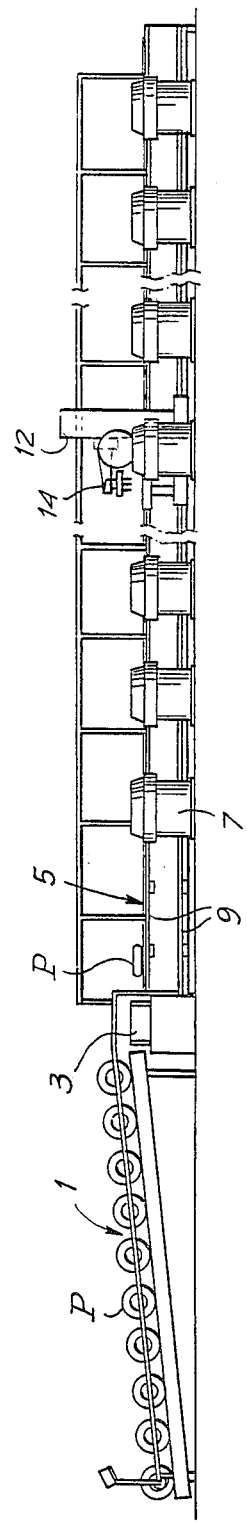
FIG. 4 is a view essentially through IV—IV in FIG. 1.

According to the illustrations in the attached drawing, 1 indicates available stocks of tires P each of which may be restocked with equivalent tires, and the same or different types in the various stocks, which are laid out in accordance with the location of the presses, and in particular the molds fitted to them, with which the device is equipped. Each stock of tires 1 has a conveyor (or may use a communal, movable conveyor) to unload a tire onto an auxiliary transverse conveyor 3 which moves the tires that have been preselected and unloaded from stock 1 according to the arrow shown in FIG. 1. Conveyor 3 unloads the individual tires onto main conveyor 5 which is set up alongside a line of presses 7 which are arranged in a particular way according to the processes to be carried out; all the presses are identical and in particular may receive the same or a different mold according to the tire to be processed. A carriage 12, which has an arm 14 with an iron hand or tire grab generally shown as 16 and illustrated in more detail in FIGS. 5 and 6 may move along conveyor 5 on suitable guides generally shown as 9. Arm 14 with tire grab 16 is used to transfer a tire from conveyor 5 to a press and from the press to conveyor 5. Carriage 12 may move in alignment with each of the presses 7, to unload the finished, retreaded tire or collect the incoming tire intended for a particular press. Arm 14 may be raised and lowered and moved angularly.

Devices for determining the position of the conveyed tire are provided along conveyor 5, and particularly at the start of conveyor 5, after a tire has been unloaded onto it from conveyor 3. A tire P comes to rest against a pair of buffers 18 which are attached to associated arms 20 symmetrical between them and which may be moved either separately or at the same time by devices 22 or by a single control device and hinged gearing. When a tire P of any diameter reaches the area of the two buffers 18 which are stationary and closer together than the diameter of the tires, it comes to rest on at least one of the buffers 18 and as conveyor 5 continues to travel it moves round the buffer which it reached first so as to rest against the second buffer too, which is in a position which is perfectly defined longitudinally and with respect to which the center of the tire is always in alignment as defined above. Arms 20 then operate to withdraw buffers 18 whilst conveyor 5 stops to allow carriage 12 time to move into alignment with the press to be unloaded and fed; at this point the arm collects the treated tire and places it on conveyor 5, which restarts so as to unload said treated tire and bring the tire that has already been stopped and centered to the carriage. To stop said tire in the desired position, carriage 12—which moves each time in order to reach the feed position of a particular press—is equipped with a set of optical sensors in the form of photoelectric cells 24, 26 and 28. The first cell sensor 24 is used to slow down the advance of conveyor 5 so as to improve the accuracy of the measurements and the subsequent operations to stop the tire. The second photoelectric cell sensor 26 is used to measure the diameter of the incoming tire; this measurement takes account of the speed of the conveyor and the points at which the sensor starts and stops monitoring. The third optical sensor, which is the third photoelectric cell 28, is used to ensure that the tire stops in the correct position for it to be collected. Photoelectric cell 28 supplies the monitoring or monitoring-completed signal from the tire in the position in which the tire is to be stopped; this position is some distance away from the photoelectric cell and such that the distance from the center of the tire is half the diameter which was calculated by processing the data from photoelectric cell 26. Therefore, wherever carriage 12 may be, it can stop the incoming tire with its center in the correct position so that the tire may be collected by arm 14 (and hence by grab 16) on carriage 12 in order to be taken to press 7 which is to be loaded with the incoming tire and which will have been preselected on the basis of the data from the press whose curing cycle has been completed.

This arrangement ensures that the various presses are supplied according to a routine which allows a tire of the required dimensions to arrive at the press that requires it at the right time, with virtually no manual involvement and no down-time as regards the operations of the presses.

The same arm 14 which loads the tires also unloads the finished tires which are removed by means of the same conveyor 5.

Figure 6:
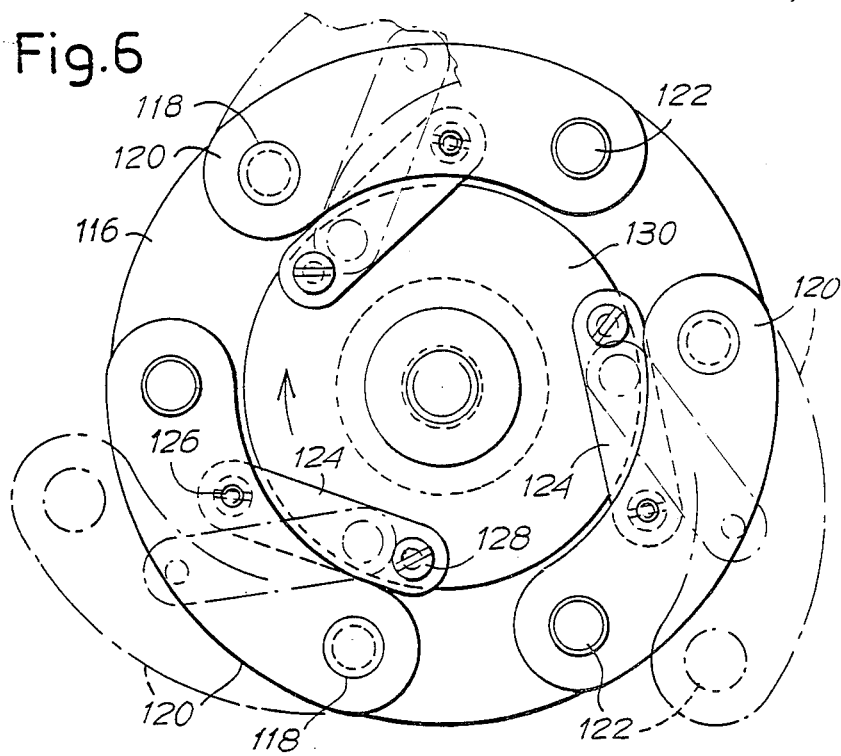
FIGS. 5 and 6 show a detail, in diametral section and viewed from below, of a tire grab.
Figure 5:
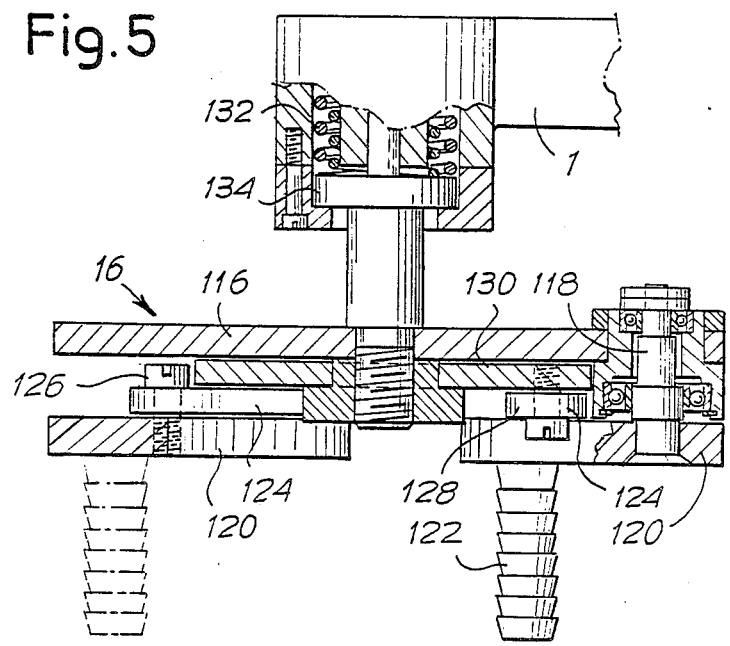

FIGS. 5 and 6 show a grab or iron hand which is fitted on the end of the arm and is used to collect the tires by grasping their inside rims. The grab—generally illustrated by 16—comprises a plate 116, hinged to which at 118 are arms 120, the ends of which have pegs 122 which are intended to move approximately radially in order to grasp the rim of the tires. To operate the arms 120 there are link rods 124 hinged to arms 120 at 126 and to a control disk 130, which is coaxial to plate 116, at 128. When a suitable instruction is given, disk 130 rotates in one direction or the other to advance and withdraw pegs 122 and hence to slip into and engage with the rim or release it and move upward, the movement of the grab being combined with the movement that raises and lowers the arm on carriage 12. The grab may be articulated on the end of the arm by means of flexible coupling 132, 134 (see FIG. 5) which fixes flange 134 in a seat on the arm, although it is also sufficiently flexible to adjust to the hold and to indicate any anomalies in excess of a certain size.

It is understood that the drawing only shows an example which is intended solely as a practical illustration of the invention, as the forms and arrangements in the invention may vary; this will not, however, go beyond the scope of the design that is the basis of the invention.

I claim:

1. A handling device for feeding tires to be remolded to presses from stocks of tires comprising:
   at least one conveyor belt for having a tire placed on it;
   means for positioning the tire in a predetermined position on said conveyor belt measured transversely to the direction of belt travel;
   a sensing means for monitoring a longitudinal position of said tire measured along the direction of belt travel;
   a stopping means connected to said sensing means for stopping the tire in a predetermined location;
   a collecting means for collecting the tire at said predetermined location.

2. A handling device according to claim 1, wherein said predetermined position is a centered position, said means for positioning the tire in a predetermined position includes a pair of stops against which the conveyed tire comes to rest and with respect to which it is centered, and at least one device for simultaneously releasing said stops to allow the centered tire to continue to pass.

3. A handling device according to claim 2, wherein the sensing means includes a first sensor for detecting the tire at a first location;
   a conveyor control means connected to said first sensor for slowing said at lest one conveyor belt; a second sensor connected to a measuring means for measuring a diameter of the tire;
   a determining means for determining the center of the tire and for sending a signal to said control means to stop the conveyor so that the tire center is stopped at said predetermined location.

4. A tire molding apparatus handling device for tires to be remolded comprising:
   at least one conveyor;
   a stock means containing a plurality of types of tires;
   a selector for selectively providing each of said types of tires to said at least one conveyor;
   a plurality of remolding presses each having a mold type corresponding to each of said types of tires;
   each of said presses arranged adjacent said at least one conveyor;
   a carriage disposes to move substantially parallel to said at least one conveyor, a substantially vertical axis through said carriage;
   a collecting arm with a first end connected to said carriage and arranged to move pivotally around said substantially vertical axis, said collecting arm having a second end;
   a tire grab connected to said collecting arm second end for picking up and releasing the tire;
   a sensing means adjacent said at least one conveyor for sensing the presence of a tire on said conveyor, and a measuring means for an amount of time the tire takes to pass said sensing means, a data processor for locating a center location of the tire by integrating the amount of time the tire takes to pass the sensing means with the speed of the conveyor;
   a belt control means to receive data from said data processor to stop said conveyor so that said center location is at a stopping location;
   said collecting arm being in a first position with said tire grab located over said stopping location for picking up the tire, said collecting arm being pivotally movable to a second position with said tire grab located over said remolding press containing said mold type which corresponds to said tire type for releasing the tire into said press;

the tire being retrievable by said tire grab from said press and returnable to said conveyor;

an availability signal sendable to said selector indicating the availability of said press, said selector upon receipt of said availability signal supplying one of said tire types to said conveyor corresponding to said mold type.

5. A device according to claim 4, further comprising a positioning means for positioning each of said tires in a predetermined position measured transversely to the direction of conveyor travel.

6. A device according to claim 4, further comprising a monitoring device to monitor the presence of the tire in order to start said conveyor.

7. A device according to claim 4 wherein said tire grab comprises:

a plate having a central axis;

a control disk arranged coaxially to said plate;

a plurality of arms each with a first end pivotally connected to said plate and each having a second end, a plurality of pegs attached to each of said arms second end;

a plurality of link rods each having a first end pivotally connected to said control disk and each having a second end pivotally connected to said plurality of arms between said arm first end and said arm second end;

said control disk being controllably rotatable relative to said plate in one direction and the other direction to advance and withdraw said pegs approximately radially in order to grasp the rim of the tire.

8. A device according to claim 4, wherein said sensing means comprises a first sensor for sensing the presence of the tire at a longitudinal location on said at least one conveyor, a conveyor control means for receiving a signal to slow down said at least one conveyor;

a second sensor for sensing the amount of time the tire takes to move past a second location;

a third sensor for sensing the presence of an edge of the tire at a distance from said stopping location which is substantially equal to a radius of the tire and signalling to said belt control means to stop said belt.

9. A device according to claim 8, wherein said first, second and third sensors are mounted on said carriage.

10. A device according to claim 4, wherein said presses have various mold types for receiving corresponding various tire types;

the tire being in one of said presses during a remolding stage, the tire being out of said press defining an availability of said press;

a selection means for selectively feeding said tire types onto said at least one conveyor;

a signalling means for controlling said selection means;, said signalling means signalling said selection means according to the availability of said presses.

11. A device as claimed in claim 10, which comprises a carriage with the collecting arm and the sensors, which move along the conveyor to take up a position in alignment with the press that has called for the tire.

12. A device according to claim 11, which comprises a device for monitoring the presence of a tire in order to start the conveyor.

13. A device according to claim 12, which comprises a conveyor in two sections, the first alongside the stocks of tires and the second alongside the various presses.

* * * * *